United States Patent [19]
Mori

[11] Patent Number: 4,589,400
[45] Date of Patent: May 20, 1986

[54] SOLAR RAY COLLECTING DEVICE

[76] Inventor: Kei Mori, 3-16-3-501, Kaminoge, Setagaya-ku, Tokyo, Japan

[21] Appl. No.: 649,398

[22] Filed: Sep. 11, 1984

[30] Foreign Application Priority Data

Sep. 19, 1983 [JP] Japan .................. 58-172773

[51] Int. Cl.⁴ .............................................. F24J 3/02
[52] U.S. Cl. .................... 126/440; 126/425; 126/443
[58] Field of Search ............... 126/440, 443, 425, 447, 126/450

[56] References Cited

U.S. PATENT DOCUMENTS

| | | | |
|---|---|---|---|
| 4,205,661 | 6/1980 | Chapman | 126/447 |
| 4,294,232 | 10/1981 | Boy-Marcotte et al. | 126/443 |
| 4,355,628 | 10/1982 | Watts | 126/440 |
| 4,419,981 | 12/1983 | Mori | 126/440 |
| 4,447,718 | 5/1984 | Mori | 126/425 |
| 4,477,145 | 10/1984 | Mori | 126/440 |
| 4,491,388 | 1/1985 | Wood | 126/425 |
| 4,498,460 | 2/1985 | Mori | 126/440 |
| 4,524,758 | 6/1985 | Mori | 126/440 |

FOREIGN PATENT DOCUMENTS

| | | | |
|---|---|---|---|
| 2384216 | 11/1978 | France | 126/440 |
| 0014031 | 1/1979 | Japan | 126/440 |
| 0014150 | 1/1982 | Japan | 126/440 |
| 0085060 | 5/1983 | Japan | 126/425 |
| 0173347 | 10/1983 | Japan | 126/440 |

*Primary Examiner*—Samuel Scott
*Assistant Examiner*—Helen Ann Odar
*Attorney, Agent, or Firm*—Jordan and Hamburg

[57] ABSTRACT

A solar ray collecting device in which solar rays are focused by a lens and guided into an optical fiber and transmitted through the optical conductor onto an adequate desired portion for use in illumination or for others purposes. A solar ray collecting portion is comprised of a large number of lenses arranged on a common plane and optical fibers, the light-receiving edge of which are precisely positioned at the focal position of the respective lenses, a horizontal hollow shaft for rotatably supporting the solar ray collecting portion, and a vertical hollow rotating shaft elongated in a direction perpendicular to the horizontal hollow shaft and supporting the same unitarily. A drive means rotatably moves the solar ray collecting portion mounted on the horizontal hollow shaft around the same.

5 Claims, 6 Drawing Figures

SOLAR RAY COLLECTING DEVICE

BACKGROUND OF THE INVENTION

The present invention relates to an improvement of a solar ray collecting device, in which solar rays are focused by a lens, guided into an optical fiber, and further transmitted through an optical conductor onto an appropriate desired place for use in illumination or for other purposes.

The present applicant has previously proposed a solar ray collecting device in which solar rays are focused by a lens or the like, guided into an optical conductor, and further transmitted through the optical conductor onto an appropriate desired place for use in illumination or for other purposes.

The solar ray collecting device previously proposed by the present applicant is comprised of a capsule comprising of a transparent dome-shaped head portion placed on a solar ray collecting portion which is accommodated in side of the capsule.

The solar ray collecting portion is comprised of a large number of lenses (for instance 19) arranged concentrically for collecting solar rays, a solar ray direction sensor for detecting the direction of the sun, a support frame for unitarily supporting the lenses and the sensor, a first motor for rotating the support frame together with the lenses and the sensor around a horizontal shaft, a vertical shaft installed perpendicular to the horizontal shaft for rotating the lenses, the sensor and the support frame, and a second motor for rotating the vertical shaft.

The solar ray direction sensor detects the direction of the sun and generates a detection signal. The above-mentioned first and second motors are controlled by the detection signal so as to always direct the lenses toward the sun. The solar rays focused by the lenses are guided, respectively, into a large number of optical conductor cables (19 cables for 19 lenses), the lightreceiving edges of which are arranged at the focal position of the lenses. Furthermore, the solar rays are transmitted through the optical conductor cables onto the optional desired place.

The solar ray collecting portion is accommodated inside of the capsule in the solar ray collecting device as mentioned above, for protecting the solar ray collecting portion from wind, rain, dust, etc. Therefore, a part of the solar rays are reflected on to the surface of the capsule. When the incidence angle is equal to or larger than the critical incidence angle, the solar rays are reflected totally on to the surface of the capsule so that they cannot reach the solar ray collecting portion.

In order to avoid such a troublesome inconvenience in the afore-mentioned solar ray collecting device, the capsule is formed in the shape of a sphere and therefore the solar rays enter into the capsule always in a uniform way regardless of which direction the light-receiving surface of the solar ray collecting portion is directed to. In addition, the diameter of the light-receiving surface of the solar ray collecting portion is so determined that the most externally-situated lens in the solar ray collecting portion is located in the area within the critical incidence angle. For this reason the entire construction of the solar ray collecting device, including the capsule, turns out to be large-scaled.

Further, the heat energy generated on the focal position of the lens may increase greatly because a Fresnel lens, having a large diameter, specifically 40 cm in diameter, is employed as a focusing lens. Therefore during the period when the solar ray collecting device is employed, the optical conductor cable and its support member are distorted by the accumulated heat energy so that the light-receiving surface of the optical conductor cable deviates from the focus of the lens and therefore the equilibrium of the relationship of the light-receiving surface position and the lens position must often be adjusted.

SUMMARY OF THE INVENTION

It is therefore an object of the present invention to provide a solar ray collecting device in which an extreme temperature increase at the focal point of the respective lenses may be suppressed.

It is another object of the present invention to provide a solar ray collecting device in which a large number of small lenses, having a small diameter, are used as solar ray collecting lenses.

It is another object of the present invention to provide a solar ray collecting device in which a solar ray collecting portion is made of a thin and light material.

It is another object of the present invention to provide a solar ray collecting device in which the transparent cover member covering the solar ray collecting portion can be rotated unitarily together with the solar ray collecting portion so that the solar rays may always reach the solar ray collecting portion in a uniform way, and the entire size of the solar ray collecting device may be largely decreased.

DESCRIPTION OF THE PREFERRED EMBODIMENTS

Figure 1:
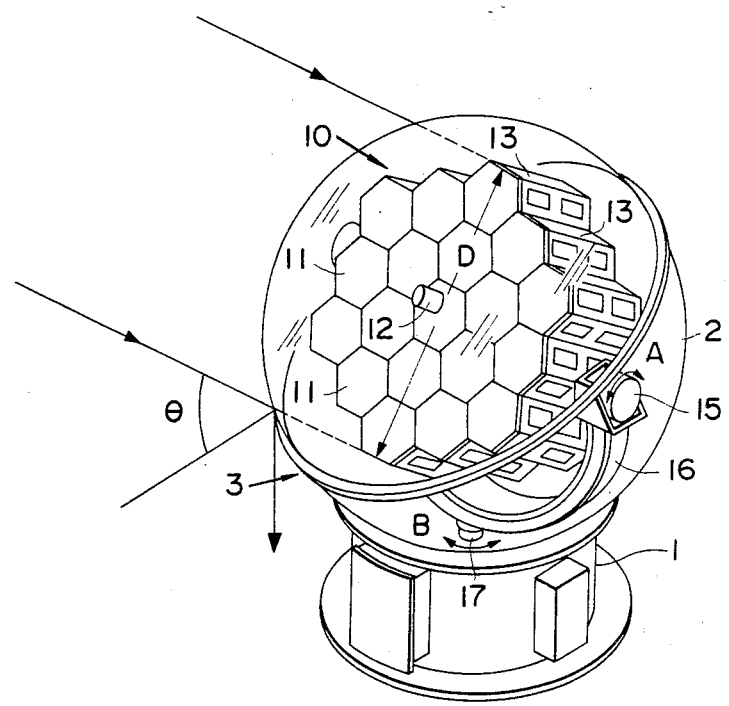
FIG. 1 is a perspective view of the conventional solar ray collecting device previously proposed by the present applicant.

FIG. 1 is a perspective view for explaining an embodiment of the solar ray collecting device previously proposed by the present applicant. In FIG. 1, 1 is a cylindrical foundation, and 2 is a transparent dome-shaped head portion. The capsule 3 of the solar ray collecting device consists of the foundation and the head portion. When the device is used, a solar ray collecting portion 10 is accommodated in the capsule 3 as shown in FIG. 1.

The solar ray collecting portion 10 is comprised of a large number of (for instance 19) lenses 11 arranged concentrically for collecting solar rays, a solar ray direction sensor 12 for detecting the direction of the sun, a support frame 13 for unitarily supporting the lenses 11 and the sensor 12, a first motor 15 for rotating the support frame 13 together with the lenses 11 and the sensor 12 in a direction shown by an arrow A, a rotatable shaft 17 installed perpendicularly to the rotatable shaft of the motor 15 for rotating the lenses 11, the sensor 12 and the support frame 13, and a second motor (not shown in FIG. 1) for rotating the rotatable shaft 17 in a direction shown by an arrow B.

The solar ray direction sensor 12 detects the direction of the sun and generates a detection signal. The above-mentioned first and second motors are controlled by the detection signal so as to direct the lenses 11 always toward the sun. The solar rays focused by the lenses 11 are guided, respectively, into a large number of optical conductor cables, etc. not shown in the figure (19 cables in the embodiment shown in FIG. 1), the light-receiving edges of which are arranged at the focal position of the lenses 11. Furthermore, the solar rays are transmitted through the optical conductor cables onto the optional desired place.

However, the solar ray collecting portion is accommodated in the capsule of the solar ray collecting device as mentioned above, for protecting the solar ray collecting portion from wind, rain, dust, etc., Therefore, a part of the solar rays are reflected on the surface of the capsule. When the incidence angle $\theta$ is equal to or larger than the critical incidence angle, the solar rays are reflected totally off of the surface of the capsule so that they cannot reach at the solar ray collecting portion.

In order to avoid such a troublesome inconvenience, in the afore-mentioned solar ray collecting device, the capsule is formed in the shape of a sphere and therefore the solar rays enter into the capsule always in a uniform way regardless of the direction in which the light-receiving surface of the solar ray collecting portion is directed to. In addition, the diameter D of the light-receiving surface of the solar ray collecting portion is so determined that the most externally-situated lens in the solar ray collecting portion is located in the area within the critical incidence angle. For this reason, the entire construction of the solar ray collecting device, including the capsule, in large-scaled.

Further, the heat energy generated on the focal position of the lens may increase greatly because a Fresnel lens, having a large diameter, specifically 40 cm in diameter, is employed as a focusing lens. Therefore, during the period when the solar ray collecting device is employed, the optical conductor cable and the support member for supporting the optical conductor cable are distorted by the accumulated heat energy so that the light-receiving surface of the optical conductor cable deviates from the focus of the lens and therefore the equilibrium of the relationship of the light-receiving surface position and the lens position must often be adjusted.

The present invention has been created in view of the situation as mentioned heretofore. Since a large number of small lenses having a small diameter (4 cm) are used as solar ray collecting lenses, the solar ray collecting portion may be made of a thin, light material. Furthermore an extreme temperature increase at the focal points of the respective lenses may be suppressed.

Figure 2:
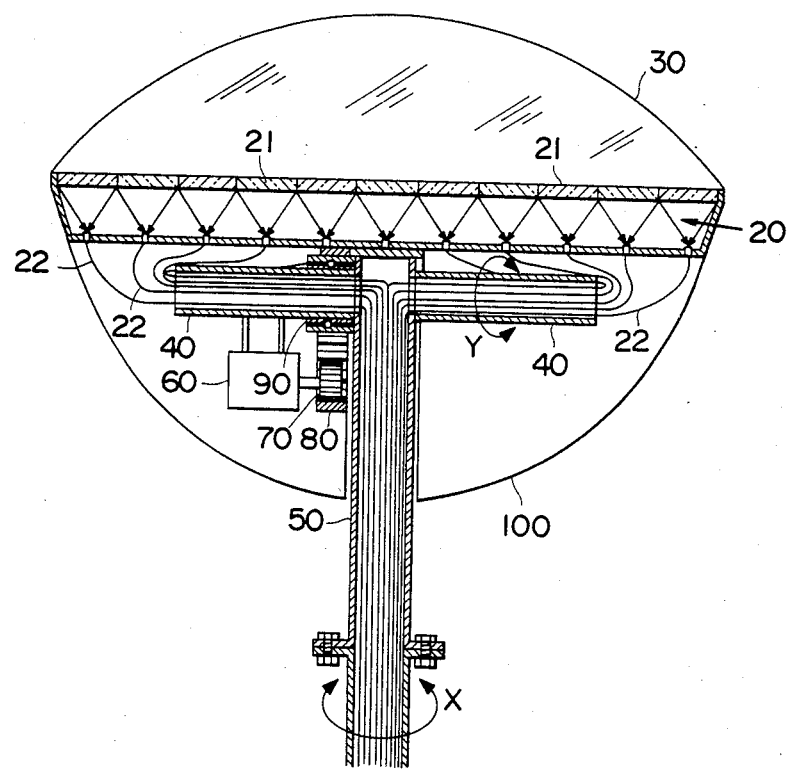
FIG. 2 is a side elevational view for explaining an embodiment of the solar ray collecting device according to the present invention.

FIG. 2 is a side elevational view for explaining an embodiment of the solar ray collecting device according to the present invention. In FIG. 2, 20 is a solar ray collecting portion, 30 is an upper transparent cover which covers the lenses' surface of the solar ray collecting portion 20, that is, the upper half thereof, 40 a hollow horizontal shaft, 50 a hollow vertical rotatable shaft for unitarily supporting the hollow shaft 40 at the upper end portion of the shaft itself (50), 60 a motor unitarily mounted on the hollow horizontal shaft 40, 70 a gear rotated by the motor 60, 80 an approximately semicircular gear engaging with the gear 70, 90 a bearing mechanism, and 100 a lower cover which covers the lower half of the solar ray collecting portion 20.

The hollow shaft 40 is fixed in the inner race of the bearing mechanism 90 and the approximately semicircular gear 80 is fixedly mounted on the outer race thereof. Consequently, since the solar ray collecting portion 20 can be rotated by rotating the vertical shaft 50, in a direction shown by an arrow X around the vertical shaft 50, and it can be rotated by the driving force of the motor 60 in a direction shown by an arrow Y around the horizontal shaft 40, it may be possible to always direct the lens surface of the solar ray collecting portion toward the sun if such above-mentioned rotation movement is controlled in accordance with the movement of the sun.

Furthermore, needless to say, the lower cover 100 is equally divided into two halves by the rotatable shaft 50, and therefore it can be freely rotated in the direction of Y.

Figure 3:
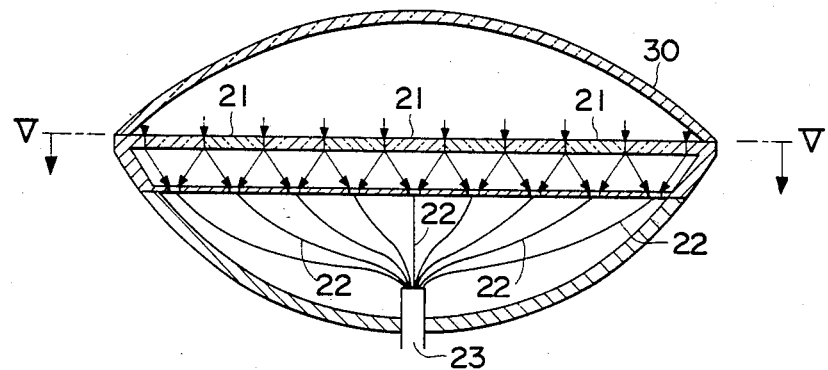
FIG. 3 is a side cross-sectional view of the solar ray collecting portion used in the embodiment of the present invention.
Figure 4:
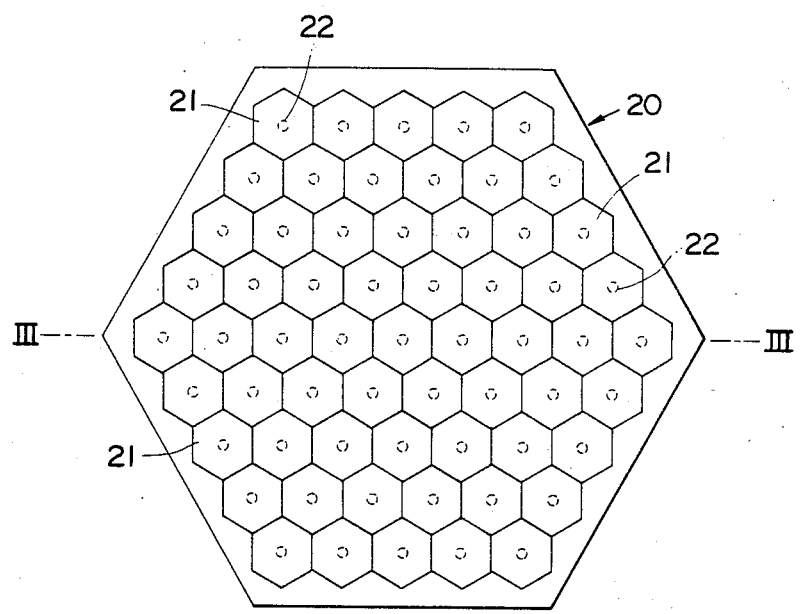
FIG. 4 is a plan view thereof.

FIG. 3 is a side, cross-sectional view of the solar ray collecting portion 20 (a cross-sectional view thereof as seen along line III—III of FIG. 4). FIG. 4 is a plan view thereof. In FIGS. 3 and 4, 21 are lenses each having a small diameter (4 cm), and 22 are optical fibers, the light-receiving surface of which are precisely positioned at the focal point of the respective lenses. In practice, several thousands of lenses as mentioned above are arranged on a unitarily formed basic board, and the light-receiving surfaces of the optical fibers is precisely positioned and fixed at the focal point of the respective lenses.

However, in the case of employing such small lenses as mentioned heretofore, the amount of the solar ray energy focused on the focal points of the respective lenses is not so large. Therefore, the optical fiber and the support member thereof may be scarcely deformed thermally. In addition, the apparatus for adjusting the position of the lens focus, etc., may not be needed. Consequently it is possible to perform the adjustment of positioning precisely the light-receiving surface of the optical fibers at the respective focal point of the respective lenses in the factory, and to fix the optical fibers at the proper focal position after performing the adjustment.

In the case of the above-mentioned situation, on both occasions when the cover 30 exists and when it doesn't, the optical system's pass differs a little from each other. Therefore, after performing the adjustment of positioning on the condition of the cover's 30 non-existence, when the cover 30 is put on the lens surface, the light-receiving edge of the optical fibers may probably deviate a little from the focus of the respective lens.

In the embodiment of the present invention, the cover 30 is formed unitarily together with the solar ray collecting portion 20. Therefore, it may be possible to position the light-receiving edge of the respective optical fibers at the focal point of the respectively corresponding lenses on the condition of the cover 30's existence, and consequently the problem of such a focal position deviating, as mentioned heretofore, may be eliminated without fail.

Figure 5:
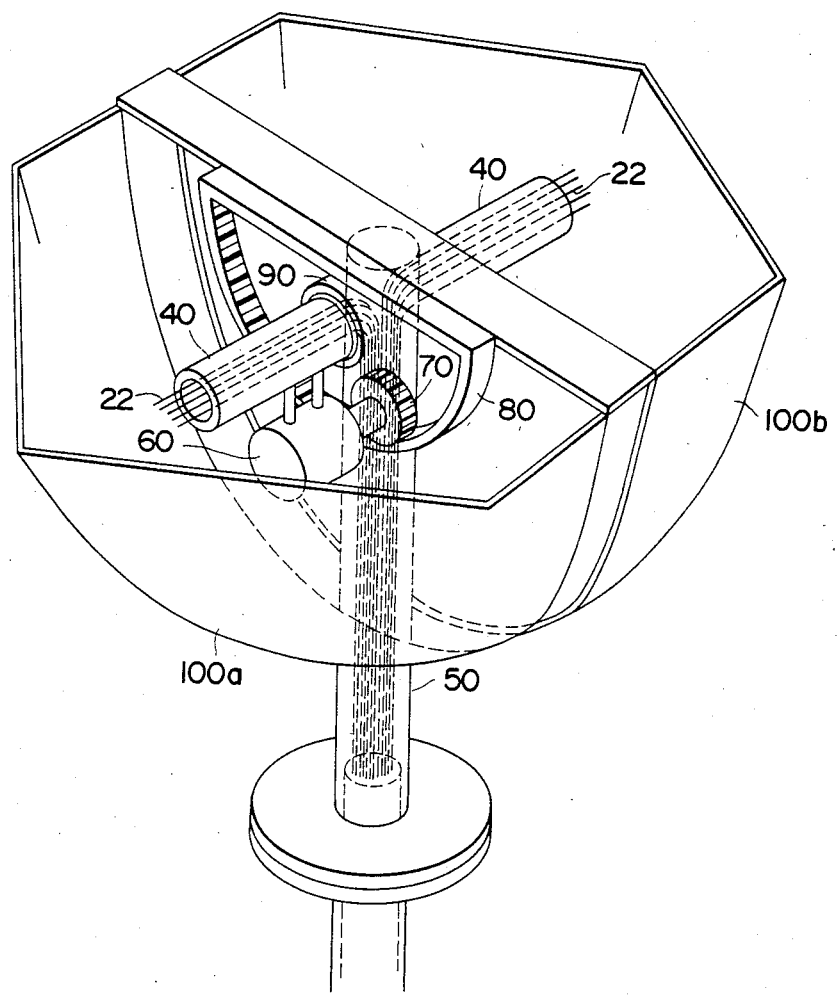
FIG. 5 is an enlarged perspective view of the solar ray collecting device according to the present invention without the upper cover and the solar ray collecting portion.

FIG. 5 is an enlarged perspective view of the solar ray collecting device according to the present invention without the upper cover 30 and the solar ray collecting portion 20. In FIG. 5, the same reference numerals as that of FIG. 2 are used for some parts performing the same function as that of FIG. 2.

In FIG. 5, the lower cover 100 is equally divided into two, 100a and 100b, by the rotatable shaft 50, and the upper edge portion thereof is opened. The optical fibers 22 are inserted into the hollow portion of the hollow horizontal shaft 40 through the opening of the cover 100. The solar rays are transmitted through the hollow portions of the hollow horizontal shaft 40 and the hollow vertical shaft 50 onto the optional desired place, and used there for illumination, etc.

Figure 6:
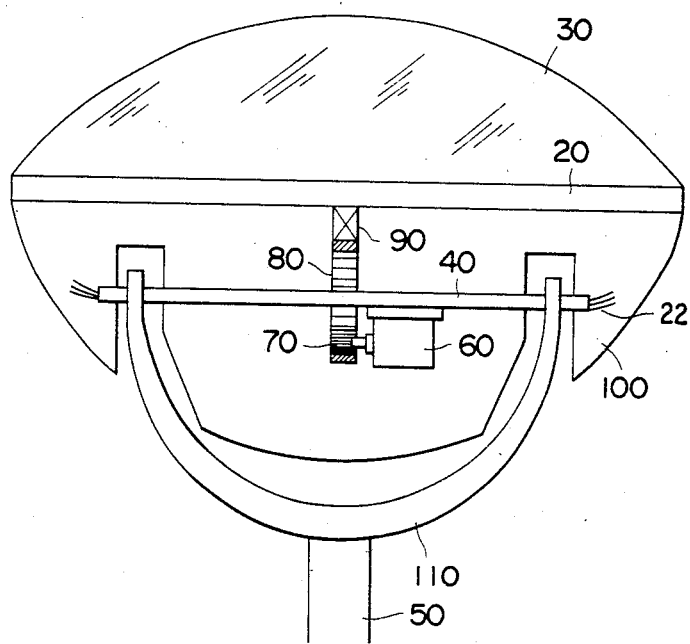
FIG. 6 is a side elevational view showing briefly another embodiment of the present invention.

FIG. 6 is a side elevational view showing briefly another embodiment of the present invention. In FIG. 6, the same reference numerals as that of FIG. 2 are used for some parts performing the same function as that of FIG. 2.

In this embodiment, a fork-shaped support arm 110 branching in two ways is unitarily installed on the tip end of the vertical movable shaft 50 and a hollow horizontal shaft 40 is unitarily installed on the support arm 110. The solar ray collecting portion 20 is constructed so as to be rotated around the hollow horizontal shaft 40 in the same manner as that of the embodiment shown in FIG. 2. The optical fibers 22 are guided through the hollow horizontal shaft 40, and the support arm 110 and the vertical rotatable shaft 50 are guided onto the optional desired place. The optical fibers 22 extending from the ends of the horizontal shaft in FIG. 6 continue on to the respective lenses as in the prior embodiments.

Consequently, according to this embodiment, the horizontal shaft 40 is supported on two points having a desired distance and equally apart from the vertical shaft 50 so that the solar ray collecting portion can be supported stably even though it is considerably large in size.

As is apparent from the foregoing description, it may be possible to provide a small-sized and maintenance-free solar ray collecting device which is very thin and doesn't need to perform any adjustment work of positioning the lens focus at the place where the solar ray collecting device is equipped after manufacturing it in the factory and shipping it therefrom.

What is claimed is:

1. A solar ray collecting device comprising a solar ray collecting portion consisting of a large number of lenses arranged on a common plane, optical fibers having light-receiving edges which are precisely positioned at the focus position of the respective lenses means for rotatively supporting said solar ray collecting portion, a horizontal hollow shaft supporting said supporting means for allowing rotation about a horizontal axis of rotation, a vertical hollow rotating shaft elongated in a direction perpendicular to said horizontal hollow shaft and supporting said horizontal hollow shaft, said vertical shaft being rotatable about a vertical axis of rotation, drive means for rotating said solar ray collecting portion about said horizontal axis of rotation, said solar ray collecting portion unitarily comprising an approximately semicircular arc gear having an axis of rotation coincident with said horizontal axis of rotation, said drive means comprising a bearing means mounting said semicircular arc gear on said horizontal hollow shaft such that said semicircular arc gear is rotatable relative to said horizontal hollow shaft, said drive means further comprising a motor means mounted on said horizontal hollow shaft and a drive gear driven by said motor means and engaging said semicircular arc gear such that said solar ray collecting portion can be directed toward the sun as said drive means rotates said solar ray collecting portion about said horizontal axis of rotation and rotation is effected about said vertical axis of rotation, said horizontal hollow shaft having two longitudinal ends and a horizontal internal passage extending between said two longitudinal ends, said vertical hollow shaft having an upper longitudinal end and a vertical internal passage, said vertical internal passage having a longitudinal axis coincident with said vertical axis of rotation, said vertical hollow shaft being unitarily joined to said horizontal hollow shaft at an intermediate position of said horizontal hollow shaft located between said two longitudinal ends of said horizontal hollow shaft, said optical fibers passing into each of said two longitudinal ends of said horizontal hollow shaft into said horizontal internal passage and then into said upper longitudinal end of said vertical hollow shaft into said vertical internal passage.

2. A solar ray collecting device according to claim 1, wherein said semicircular arc gear has internal gear teeth.

3. A solar ray collecting device according to claim 1, wherein some of said optical fibers pass into one of said two longitudinal ends of said horizontal hollow shaft and the remainder of said optical fibers pass into the other of said two longitudinal ends of said horizontal hollow shaft, all of said optical fibers passing into said upper longitudinal end of said vertical hollow shaft.

4. A solar ray collecting device according to claim 1, wherein said vertical hollow shaft is unitarily joined to the mid section of said horizontal hollow shaft.

5. A solar ray collecting device as defined in claim 1, further comprising a transparent cover covering said lens in said solar ray collecting portion.

* * * * *